United States Patent
Matsui et al.

(10) Patent No.: US 6,737,100 B1
(45) Date of Patent: May 18, 2004

(54) FOAMED CHOCOLATE AND PROCESS FOR PRODUCING THE SAME

(75) Inventors: Masayuki Matsui, Tsukuba-gun (JP); Masako Okochi, Tsukuba-gun (JP); Haruyasu Kida, Tsukuba-gun (JP)

(73) Assignee: Fuji Oil Company, Limited, Osaka (JP)

( * ) Notice: Subject to any disclaimer, the term of this patent is extended or adjusted under 35 U.S.C. 154(b) by 0 days.

(21) Appl. No.: 09/936,994

(22) PCT Filed: Mar. 30, 2000

(86) PCT No.: PCT/JP00/02050

§ 371 (c)(1),
(2), (4) Date: Sep. 19, 2001

(87) PCT Pub. No.: WO00/57715

PCT Pub. Date: Oct. 5, 2000

(30) Foreign Application Priority Data

Mar. 30, 1999 (JP) .......................................... 11-089060

(51) Int. Cl.$^7$ ................................................ A23G 1/00
(52) U.S. Cl. ....................... 426/631; 426/660; 426/572
(58) Field of Search .................................. 426/631, 660, 426/572, 570, 571, 659

(56) References Cited

U.S. PATENT DOCUMENTS

| | | | | | |
|---|---|---|---|---|---|
| 3,798,337 | A | * | 3/1974 | Abalo | 426/279 |
| 3,976,803 | A | * | 8/1976 | Koppijn | 426/572 |
| 4,839,192 | A | * | 6/1989 | Sagi et al. | 426/607 |
| 4,849,240 | A | * | 7/1989 | Giddey et al. | 426/564 |
| 4,877,636 | A | * | 10/1989 | Koyano et al. | 426/607 |
| 5,004,623 | A | * | 4/1991 | Giddey et al. | 426/564 |
| 5,126,160 | A | * | 6/1992 | Giddey et al. | 426/564 |
| 5,370,888 | A | * | 12/1994 | Hachiya et al. | 426/282 |
| 5,505,982 | A | * | 4/1996 | Krawczyk et al. | 426/660 |
| 5,508,048 | A | * | 4/1996 | Padley | 426/33 |
| 5,626,902 | A | * | 5/1997 | Kuramori et al. | 426/607 |
| 5,654,018 | A | * | 8/1997 | Cain et al. | 426/33 |
| 5,709,903 | A | | 1/1998 | St. John et al. | |
| 5,718,938 | A | * | 2/1998 | Cain et al. | 426/549 |
| 5,731,027 | A | * | 3/1998 | Cain et al. | 426/607 |
| 5,753,296 | A | | 5/1998 | Girsh | |
| 5,882,709 | A | * | 3/1999 | Zumbe | 426/481 |
| 5,968,584 | A | * | 10/1999 | Cain et al. | 426/607 |
| 6,482,464 | B1 | * | 11/2002 | Asama et al. | 426/631 |
| 2002/0090437 | A1 | * | 7/2002 | Brown et al. | 426/572 |

FOREIGN PATENT DOCUMENTS

| | | | |
|---|---|---|---|
| EP | 0 390 408 | | 10/1990 |
| EP | 427309 | | 5/1991 |
| GB | 1305520 | * | 7/1973 |
| GB | 2128924 | * | 5/1984 |
| JP | 58-198245 | | 11/1983 |
| JP | 63-28355 | | 2/1988 |
| JP | 63-56250 | | 3/1988 |
| JP | 4-173053 | | 6/1992 |
| JP | 4-197133 | | 7/1992 |
| NL | 0427309 | * | 5/1991 |
| NL | 0455278 | * | 6/1991 |
| NL | WO95/07620 | * | 3/1995 |
| NL | 2297760 | * | 8/1996 |
| WO | 02/00032 | | 1/2002 |

OTHER PUBLICATIONS

Swern, Daniel. 1979. Bailey's Industrial Oil and Fat Products, vol. 1, 4$^{th}$ edition. John Wiley & Sons, New York. p. 19, 27, 113, 416, 417.*

Swern, P. 1988. Relations between rheological and sensory properties of fat forms. Progress and Trends in Rheology II, pp. 457–458.*

Stern, P. et al., "Relation between rheological and sensory properties of fat foams", Rheologica Acta, (1988), Suppl., pp. 457–458.

* cited by examiner

*Primary Examiner*—Carolyn Paden
(74) *Attorney, Agent, or Firm*—Wenderoth, Lind & Ponack, L.L.P.

(57) ABSTRACT

A foamed chocolate which can be foamed without resort to any special apparatuses or emulsifiers, has a lightened chocolate texture and shows no oily feel. This foamed chocolate is produced by adding an oil mixture comprising an edible fat or oil with tri-saturated fatty acid glycerides containing behenic acid.

10 Claims, No Drawings

FOAMED CHOCOLATE AND PROCESS FOR PRODUCING THE SAME

This application is a 371 of PCT/JP00/02050 filed Mar. 30, 2000.

BACKGROUND OF THE INVENTION

1. Field of the Invention

The present invention relates to a foamed chocolate and its production process. More practically, it relates to a foamed chocolate which can be foamed by a simple apparatus such as a vertical type mixer without requiring a specified emulsifier and a process for producing the foamed chocolate.

2. Background Art

Recently, it tends to be increased to produce a variety of products with light textures (mouthfeel) by combining chocolates with baked confectionery, for example, biscuits. For the purpose of lightening textures of chocolate products themselves without combining with other confectionery, so-called whipped chocolate, a chocolate in which foams are incorporated into a chocolate product, is also produced. As a method for incorporating foams into a chocolate product, for example, the following methods have been reported: a method comprising steps of decreasing specific gravity by stirring a chocolate and then putting the chocolate under decreased pressure (JP 62-275648 A, JP 63-202341 A); a method comprising steps of decreasing specific gravity by incorporating a compressed gas into a blend of chocolate ingredients and restoring the pressure to be normal (JP 62-58955 A, JP 63-49040 A); a method comprising a step of foaming with emulsifiers (JP 1-144934 A, JP 5-211842A); a method comprising steps of decreasing specific gravity of a blend of chocolate ingredients by mixing foamed shortening and a blend of chocolate ingredients (JP 63-28355 A); a method comprising steps of formulating fats and oils containing a certain amount or more of triglycerides whose constituent fatty acid residues have 58 or more of total carbon atoms in a blend of chocolate ingredients, stabilizing foams incorporated by crystallization of the fats and oils, and thus decreasing the specific gravity of the blend of chocolate ingredients (JP 3-201946 A); and the like.

Further, since a chocolate contains vegetable fats and oils such as cocoa butter quickly melting around the body temperature, there occurs a problem that such a chocolate is easy to be melted in summer time. In order to prevent melting owing to the outside air temperature, high melting point fats, which are not melted at the outside air temperature, are generally added to provide the chocolate with high heat resistance. However, addition of such high melting point fats causes a problem that good mouth melt property, which is an intrinsic property of a chocolate, is deteriorated.

As described above, among the methods for incorporating foams into a blend of chocolate ingredients for the purpose of lightening a chocolate texture (mouthfeel), although those comprising steps of decreasing or increasing pressure for foaming can significantly decrease specific gravity of a chocolate, they require a large scale apparatus and they are thus unsuitable for easy and simple production of a foamed chocolate.

On the other hand, although the foaming methods using specified emulsifiers are easy, the methods require relatively large amounts of emulsifiers to be added to a blend of chocolate ingredients in order to stabilize foams incorporated and, in case of considerably decreasing specific gravity of a blend of chocolate ingredients, oil components in a blend of chocolate ingredients have to be increased (preferably 50% or higher). Further, such methods give intense taste of emulsifiers, especially synthesized emulsifiers, that is generally undesirable.

In case of using a fatty acid ester of polyglycerin with HLB of 7 to 8 as an emulsifier, it is required to whip a chocolate in a temperature range high enough to prevent crystallization of fats and oils of the chocolate itself (generally 35° C. or higher). Further, the emulsifier is easily affected with the milk fat solids of a chocolate itself, which results in, for example, difficulty in whipping of a white chocolate, while a black chocolate can be whipped. Moreover, it is difficult to completely dissolve the fats and oils because of the emulsifier of such a system which has HLB around the middle.

On the other hand, in case of using a fatty acid ester with a polyglycerin with a low HLB, fats and oils of a chocolate itself should be crystallized and, since the crystals are formed, temperature control becomes difficult after whipping. Although such a type of an emulsifier is hardly affected with the milk fat solids of the chocolate, it is affected with fats and oils to be used for a chocolate and an operation becomes complicated.

In case for producing a foamed chocolate by mixing foamed shortening, it is required to increase an amount of the shortening to be added in order to decrease specific gravity, resulting in such disadvantages that the amount of oils in the chocolate is increased as well as that the chocolate tends to have oily mouthfeel when being mixed with the foams of the shortening since foaming is performed only with the previously foamed shortening in which foams are covered only with fats and oils.

Further, in the other method disclosed in JP 3-201946 A, i.e., a method comprising steps of formulating fats and oils containing a certain amount or more of triglycerides whose constituent fatty acid residues have 58 or more of total carbon atoms in a blend of chocolate ingredients, a preferred fat and oil composition is that containing a specific amount of mixed acid triglycerides which contains at least one residue of saturated fatty acid residues having 20 to 24 carbon atoms and at least one unsaturated acid fatty acid residue having 16 to 22 carbon atoms in a molecule, whose constituent fatty acids are saturated fatty acids having 20 to 24 carbon atoms and unsaturated fatty acids having 16 to 22 carbon atoms present in a specified ratio. However, such fats and oils do not exist so much in nature and therefore it is required to carry out interesterification of fat and oil raw materials so that such a fat and oil composition can be realized and further to carry out fractionation to obtain fractionated middle melting point portions and subsequently, production of such a fat and oil composition itself becomes extremely complicated. Further, being in a melted state, if a fully hydrogenated oils of tri-saturated triglycerides are added to a blend of chocolate ingredients in place of those fats and oils, the melting point of the fats and oils in the blend of chocolate ingredients is increased to make whipping impossible.

On the other hand, as a method for providing a chocolate with high heat resistance, it is general to add high melting point fats, however it results in a disadvantage that mouth melt property, which is one of intrinsic properties of a chocolate, is deteriorated. That is because high melting point fats remain in the mouth for a long period of time without being melted owing to the increase of the melting point of the fat and oil themselves by addition of the high melting point fats and more particularly owing to the increase of the content of fats in solid around a body temperature or at a temperature slightly higher than the body temperature attributed to the effect of the high melting point fats.

SUMMARY OF THE INVENTION

The present inventors have studied intensively and, as a result, they have found that a foamed chocolate can be obtained without resort to any special apparatuses or emulsifiers. Thus, the present invention has been completed.

That is, the present invention provides a foamed chocolate comprising formulating an oil mixture comprising edible fats and oils with tri-saturated fatty acid glycerides containing behenic acid; a process for producing such a foamed chocolate comprising melting the crystals of an oil mixture comprising edible fats and oils with tri-saturated fatty acid glycerides containing behenic acid by heating, cooling the oil mixture to precipitate the crystals of the tri-saturated fatty acid glycerides containing behenic acid, adding the oil mixture in such a state to a chocolate, and whipping the resulting chocolate; and an oil and fat composition comprising crystals of tri-saturated fatty acid glycerides containing behenic acid dispersed in low melting point-fats and oils having a melting point lower than that of the glycerides.

Most Preferred Embodiments of the Invention

The edible fats and oils used in the present invention include, for example, vegetable fats and oils such as rapeseed oil, soybean oil, sunflower seed oil, cottonseed oil, peanut oil, rice bran oil, corn oil, safflower oil, olive oil, kapok oil, sesame oil, evening primrose oil, palm oil, shea butter, sal butter, cacao butter, coconut oil, palm kernel oil, and the like; and processed fats and oils produced by hydrogenation of these fats and oils, fractionation of them, interesterification of them and the like. The vegetable fats and oils are excellent in taste as compared with animal fats and oils such as fish oils. It is preferable to use fats and oils in liquid state at 20° C. When an oil mixture comprising fats and oils in liquid state at 20° C. and tri-saturated fatty acid glycerides containing behenic acid is added to a blend of chocolate ingredients (a mixture of chocolate liquor and other ingredients) and whipped, since the tri-saturated fatty acid glycerides containing behenic acid keeps fluidity even in crystallized state in a wide temperature range, the workability is improved. Alternatively, it is preferable to use hard butter, for example, cacao butter, tempered type fats and oils such as substitutes of cacao butter and the like, trans-type hard butter containing elaidic acid as a constituent fatty acid, as well as coconut oil, palm kernel oil, and lauric type fats and oils such as their hydrogenated oils and the like. The heat resistance of a foamed chocolate is improved by obtaining the foamed chocolate by adding an oil mixture containing a hard butter and tri-saturated fatty acid glycerides containing behenic acid to a chocolate texture and whipping the resulting mixture.

The tri-saturated fatty acid glycerides containing behenic acid of the present invention can generally be obtained by hydrogenating fats and oils containing erucic acid as to have iodine value 1 or lower and the melting point at 60° C. or higher. (Saturated behenic acid can be obtained by hydrogenating unsaturated erucic acid). As fats and oils containing 30% or higher of erucic acid are rapeseed oil with a high erucic acid concentration, mustard oil, cramb oil, uzenbaren oil, and the rapeseed oil with high erucic acid concentration is preferable owing to easiness to be obtained. Also, the tri-saturated fatty acid glycerides mean triglycerides containing constituent fatty acids all of which are saturated fatty acids.

It is preferred in the present invention to use the edible fats and oils together with the tri-saturated fatty acid glycerides containing behenic acid in the ratio of 85:15 to 95:5. If the tri-saturated fatty acid glycerides are more than the above described ratio, the fluidity of the oil mixture is deteriorated and not only handling of the mixture but also whipping property tend to be deteriorated at the time of mixing with a chocolate texture. On the other hand, if the tri-saturated fatty acid glycerides are less than the ratio, the whipping property is deteriorated at the time of mixing with a chocolate texture.

For adding the oil mixture containing edible fats and oils as well as tri-saturated fatty acid glycerides containing behenic acid to a blend of chocolate ingredients, it is preferable to add the tri-saturated fatty acid glycerides at their final concentration in the blend of chocolate ingredients of 0.5 to 2%, more preferably 1 to 2%. If the addition amount is higher than this range, the melting point of the fats and oils becomes too high and, although whipping can be performed at first, the viscosity sharply increased during the whipping step and some time solidification takes place depending on the temperature at the time of whipping. Further, even if whipping can be performed, although being provided with high heat resistance, the resulting chocolate becomes considerably inferior in mouth melt property and its product value as confectionery is considerably lowered. In contrast with that, if the addition amount is lower than the above range, the specific gravity of the chocolate is not decreased.

The specific gravity of a foamed chocolate in the present invention is 0.5 to 0.9. If the specific gravity is higher than 0.9, the chocolate texture is same as those of conventional chocolates and light texture can not be obtained. In contrast with that, if the specific gravity is lower than 0.5, the chocolate texture is significantly lightened, however the fluidity of the chocolate is eliminated owing to the rather high quantity of foams incorporated and thus the workability after whipping is undesirably much deteriorated. Incidentally, the specific gravity is measured by filling a container with a foamed chocolate, measuring the weight of the content, and dividing the measured weight by the weight of the water with which the container is filled.

In the present invention, it is preferable to use fats and oils produced by completely melting an oil mixture containing edible fats and oils with tri-saturated fatty acid glycerides containing behenic acid and then cooling the temperature of the oil mixture to 30 to 45° C. to precipitate crystals and using the resulting oil mixture in cooled state. Owing to that, a fat and oil composition in which crystals of tri-saturated fatty acid glycerides containing behenic acid are dispersed in low melting point fats and oils having lower melting points than those of lot the glycerides can be obtained and it is suitable to be used as an additive for foaming. Using an apparatus capable of kneading an oil mixture, e.g. an Onreitor™, the oil mixture containing edible fats and oils with tri-saturated fatty acid glycerides containing behenic acid is cooled after it is completely melted to 30 to 45° C. and kept cooled to produce the oil mixture. When using a method other than the above, for example, a method comprising steps of simply keeping the oil mixture at a room temperature and then gradually cooling the oil mixture, the size of the crystals becomes too large and therefore the oil mixture becomes unsuitable to incorporate foams into a chocolate. In contrast with that, if rapid cooling is carried out using a Combinator™, the resulting oil mixture in this case also becomes unsuitable to incorporate foams into a chocolate supposedly attributed to the difference of the crystal systems.

In the present invention, an oil mixture containing edible fats and oils with tri-saturated fatty acid glycerides containing behenic acid is required to be whipped at a temperature at which the crystals of the tri-saturated fatty acid glycerides containing behenic acid are not melted. Especially, it is required for the tri-saturated fatty acid glycerides containing behenic acid in crystallized state and owing to that, since the tri-saturated fatty acid glycerides containing behenic acid do not mutually affect, for example, cocoa butter or the like in the blend of chocolate ingredients, they do not deteriorate mouth melt property of a chocolate. However, when the oil mixture is used in completely melted state, not only the amount of crystals necessary to carry out whipping is insufficient to decrease the specific gravity of a chocolate but also the tri-saturated fatty acid glycerides containing behenic acid mutually affect the other fats and oils, for example, cocoa butter in a blend of chocolate ingredients to increase the melting points of the fats and oils and, resulting in the finally obtained chocolate with considerably inferior mouth melt property even though the heat resistance of the chocolate is increased. Hence, the product temperature of a blend of chocolate ingredients is required to be adjusted within a range from 25° C. to 40° C. and the temperature of the oil mixture containing edible fats and oils with tri-saturated fatty acid glycerides containing behenic acid has to be adjusted the same and they are mixed and then whipped. Incidentally, in the case of using a tempering type blend of chocolate ingredients, it is possible to carry out mixing at a temperature, for example, 31° C., at which tempering of a chocolate subjected to tempering is not broken, and then to carry out whipping.

A chocolate of the present invention includes any chocolates; a sweet chocolate, a milk chocolate, a black chocolate, a white chocolate and the like, in terms of blending of ingredients and also includes those produced using other fats and oils in place of some or entire amount of cacao butter, especially using a cacao butter substitute (hard butter). Any conventionally known chocolates may be usable. The content of a raw material chocolate in a foamed chocolate is preferably 60% or higher.

EXAMPLES

The present invention will be described more particularly along with examples of the present invention, however the true scope of the present invention is not at all restricted to these examples described below. Incidentally, the terms, "percents" and "parts" in the examples respectively are by weight.

Example 1

After an oil mixture of 90 parts of slightly hydrogenated rapeseed oil (iodine value 95) with a low erucic acid content and 10 parts of a fully hydrogenated oil (iodine value 1 or lower, melting point 62° C.) of rapeseed oil with a high erucic acid content, as the tri-saturated fatty acid glycerides containing behenic acid was completely melted at 80° C., the resulting oil mixture was cooled to 40° C. of product temperature of the oils and fats in a water tank containing water at 15° C. to precipitate crystals of the tri-saturated fatty acid glycerides containing behenic acid and the resulting oil mixture in such a state was kept at 20° C. Separately, 90 parts of a sweet chocolate (produced by Fuji Oil. Co., Ltd., trade name, "Sweet Chocolate", oil content 34%) subjected to tempering at the minimum point 26° C. and reheating point at 28° C. was preserved at product temperature 30° C. and mixed with 10 parts of the above described oil mixture and whipped by a Kenwood mixer (using a whipper) at a high stirring speed to obtain a foamed chocolate. The specific gravity of the obtained foamed chocolate was measured and found 0.75.

Example 2

Twenty parts of an oil mixture produced in the same manner as the Example 1 from 90 parts of rapeseed oil (iodine value 117) with a low erucic acid content and 10 parts of a fully hydrogenated oil (iodine value 1 or lower, melting point 62° C.) of rapeseed oil with a high erucic acid content, as the tri-saturated fatty acid glycerides containing behenic acid was added to 80 parts of a chocolate produced from a milk chocolate (produced by Fuji Oil. Co., Ltd., trade name, "Milk Chocolate", oil content 34%), which was melted in a water bath at 50° C., cooled to 30° C., mixed with a seed agent (produced by Fuji Oil Co., Ltd., trade name, "Choco Seed A") in 0.2% to the chocolate, and subjected to tempering, and then a foamed chocolate was obtained from the resulting mixture by the same treatment as that of the Example 1. The specific gravity of the obtained foamed chocolate was measured and found 0.66.

Example 3

A foamed chocolate was obtained by the same treatment as that of the Example 1 except that the mixing amounts of the slightly hydrogenated rapeseed oil (iodine value 95) with a low erucic acid content and the fully hydrogenated oil (iodine value 1 or lower, melting point 62° C.) of rapeseed oil with a high erucic acid content, as the tri-saturated fatty acid glycerides containing behenic acid were changed to be 95 parts and 5 parts, respectively, and 20 parts of the resulting oil mixture was added to 80 parts of the chocolate subjected to tempering. The specific gravity of the obtained foamed chocolate was measured and found 0.84.

Example 4

Twenty parts of an oil mixture produced in the same manner as the Example 1 from 90 parts of the slightly hydrogenated rapeseed oil (iodine value 95) with a low erucic acid content and 10 parts of the fully hydrogenated oil (iodine value 1 or lower, melting point 62° C.) of rapeseed oil with a high erucic acid content, as the tri-saturated fatty acid glycerides containing behenic acid was added to 80 parts of a non-tempered chocolate (produced by Fuji Oil. Co., Ltd., trade name, "MSM", oil content 36%) and whipped at product temperature 40° C. by high speed stirring to obtain foamed chocolate. The specific gravity of the obtained foamed chocolate was measured and found 0.85.

The characteristics of the produced foamed chocolates are collectively shown in Table 1.

TABLE 1

| | | Results of the Example 1 to the Example 4 | | | |
|---|---|---|---|---|---|
| No. | Item | Example 1 | Example 2 | Example 3 | Example 4 |
| 1 | Edible fats and oils | Slightly hydrogenated oil of rapeseed oil with low erucic acid content | Rapeseed oil with a low erucic acid content | Slightly hydrogenated oil of rapeseed oil with low erucic acid content | Slightly hydrogenated oil of rapeseed oil with low erucic acid content |

TABLE 1-continued

Results of the Example 1 to the Example 4

| No. | Item | Example 1 | Example 2 | Example 3 | Example 4 |
|---|---|---|---|---|---|
| 2 | Types of tri-saturated fatty acid glycerides or other high melting point fats and oils | fully hydrogenated oil of rapeseed oil with a high erucic acid content | fully hydrogenated oil of rapeseed oil with a high erucic acid content | fully hydrogenated oil of rapeseed oil with a high erucic acid content | fully hydrogenated oil of rapeseed oil with a high erucic acid content |
| 3 | Ratio of 1 to 2 | 90:10 | 90:10 | 95:5 | 90:10 |
| 4 | Ratio of 3 to chocolate | 10:90 | 20:80 | 20:80 | 20:80 |
| 5 | oil content (%) of 4 | 40.6 | 47.2 | 47.2 | 48.8 |
| 6 | specific gravity of 4 | 0.75 | 0.66 | 0.84 | 0.85 |
| 7 | Content (%) of 2 in the total amount of chocolate | 1 | 2 | 1 | 2 |
| 8 | Temperature (° C.) at the time of whipping | 30 | 30 | 30 | 40 |
| 9 | Workability | Good | Good | Good | Good |
| 10 | Taste feel | Good | Good | Good | Good |

The chocolates of the Examples 1 to 4 were provided with the specific gravity values sufficiently decreased as compared with conventional chocolates and gave lightened textures. Regarding the workability, no trouble took place in their production work. In such a way, that foams were made possible to be incorporated to the chocolates using a simple apparatus was supposedly attributed to that the crystal system and the size might become optimum to incorporate foams since the oil mixtures of edible fats and oils with tri-saturated fatty acid glycerides containing behenic acid were completely melted at first and then cooled down the product temperature to 30° C. to 45° C. to precipitate crystals of the tri-saturated fatty acid glycerides containing behenic acid and the resulting cooled fats and oils were used.

Example 5

After an oil mixture of 89 parts of hard butter (iodine value 34, melting point 34° C., produced by Fuji Oil Co., Ltd., trade name, "Melano New SS7") and 11 parts of a fully hydrogenated oil (iodine value 1 or lower, melting point 62° C.) of rapeseed oil with a high erucic acid content, as the tri-saturated fatty acid glycerides containing behenic acid was completely melted at 80° C., the oil mixture was cooled to 38° C. of product temperature of the oils and fats in a water tank containing water at 15° C. to precipitate crystals of the tri-saturated fatty acid glycerides containing behenic acid and the resulting oil mixture in such a state was kept at 20° C. Separately, to a milk chocolate (produced by Fuji Oil. Co., Ltd., trade name, "Milk chocolate", oil content 34%), the hard butter (iodine value 34, melting point 34° C., produced by Fuji Oil Co., Ltd., trade name, "Melano New SS7") for oil component adjustment was added to adjust the oil components to be 41%, and after cooling it to 35° C., adding a seed agent (produced by Fuji Oil Co., Ltd., trade name, "Choco Seed B") in 3.0% in the chocolate, and tempering, 90 parts of the resulting chocolate was mixed with 10 parts of the above described oil mixture whose temperature was controlled at 37° C. and whipped by a Kenwood mixer (using a whipper) at a high stirring speed to obtain a foamed chocolate. The specific gravity of the obtained foamed chocolate was measured and found 0.78.

Example 6

After an oil mixture of 89 parts of a hydrogenated oil (iodine value 71, melting point 35° C.) of rapeseed oil with a low erucic acid content and 11 parts of a fully hydrogenated oil (iodine value 1 or lower, melting point 62° C.) of rapeseed oil with a high erucic acid content, as the tri-saturated fatty acid glycerides containing behenic acid was completely melted at 80° C., the oil mixture was cooled to 40° C. of product temperature of the fats and oils in a water tank containing water at 15° C. to precipitate crystals of the tri-saturated fatty acid glycerides containing behenic acid and the resulting oil mixture in such a state was kept at 20° C. Separately, to a sweet chocolate (produced by Fuji Oil. Co., Ltd., trade name, "Sweet Chocolate", oil components 34%), the hard butter (iodine value 34, melting point 34° C., produced by Fuji Oil Co., Ltd., trade name, "Melano New SS7") for oil component adjustment was added to adjust the oil components to be 41%, and after cooling it to 30° C., adding a seed agent (produced by Fuji Oil Co., Ltd., trade name, "Choco Seed A") in 0.2% in the chocolate, and tempering, 90 parts of the resulting chocolate was mixed with 10 parts of the above described oil mixture whose temperature was controlled at 40° C. and whipped by a Kenwood mixer (using a whipper) at a high stirring speed to obtain a foamed chocolate. The specific gravity of the obtained foamed chocolate was measured and found 0.80.

Example 7

After an oil mixture of 89 parts of a refined coconut oil (iodine value 8.5, melting point 24° C.) and 11 parts of a fully hydrogenated oil (iodine value 1 or lower, melting point 62° C.) of rapeseed oil with a high erucic acid content, as the tri-saturated fatty acid glycerides containing behenic acid was completely melted at 80(C, the oil mixture was cooled to 32.5© of product temperature of the fats and oils in a water tank containing water at 15© to precipitate crystals of the tri-saturated fatty acid glycerides containing behenic acid and the resulting oil mixture in such a state was kept at 20° C. Separately, to a sweet chocolate (produced by Fuji Oil. Co., Ltd., trade name, "Sweet Chocolate", oil components 34%), the hard butter (iodine value 34, melting point 34° C., produced by Fuji Oil Co., Ltd., trade name, "Melano New SS7") for oil component adjustment was added to adjust the oil components to be 41%, and after cooling it to 30° C., adding a seed agent (produced by Fuji Oil Co., Ltd., trade name, "Choco Seed A"),in 0.2% in the chocolate, and tempering, 90 parts of the resulting sweet chocolate was mixed with 10 parts of the above described oil mixture whose temperature was controlled at 35© and whipped by a Kenwood mixer (using a whipper) at a high stirring speed to obtain a foamed chocolate. The specific gravity of the obtained foamed chocolate was measured and found 0.79.

The characteristics of the produced foamed chocolates are collectively shown in Table 2.

TABLE 2

Results of the Example 5 to the Example 7

| No. | Item | Example 5 | Example 6 | Example 7 |
|---|---|---|---|---|
| 1 | Edible fats and oils | Hard butter | Hydrogenated oil with a low erucic acid content | Refined coconut oil |
| 2 | Type of tri-saturated fatty acid glycerides or other high melting point fats and oils | fully hydrogenated oil of rapeseed oil with a high erucic acid content | fully hydrogenated oil of rapeseed oil with a high erucic acid content | fully hydrogenated oil of rapeseed oil with a high erucic acid content |
| 3 | Ratio of 1 to 2* | 89:11 | 89:11 | 89:11 |
| 4 | Ratio of 3 to chocolate | 10:90 | 10:90 | 10:90 |
| 5 | Oil content (%) of 4 | 47.2 | 47.2 | 47.2 |
| 6 | Specific gravity of 4 | 0.78 | 0.8 | 0.79 |
| 7 | The content (%) of 2 in the total amount of chocolate | 1.1 | 1.1 | 1.1 |
| 8 | Temperature (° C.) at the time of whipping | 33 | 30 | 30 |
| 9 | Workability | Good | Good | Good |
| 10 | Taste feel | Good | Good | Good |

Regarding the chocolates of the Examples 5 to 7, the specific gravity values were sufficiently decreased as compared with those of conventional chocolates and their taste feel was lightened. Regarding the workability, no trouble took place in their production work. In such a way, that foams were made possible to be incorporated into the chocolates using a simple apparatus was supposedly attributed to that the crystal system and the size might become optimum to incorporate foams since the oil mixtures of edible vegetable fats and oils with tri-saturated fatty acid glycerides containing behenic acid were completely melted at first and then cooled down the product temperature to 30° C. to 45° C. to precipitate crystals of the tri-saturated fatty acid glycerides containing behenic acid and the resulting cooled fats and oils were used.

The heat resistance of the produced foamed chocolates was evaluated.

Evaluation Example 1

After foamed chocolates produced in the Example 5 were aged at 20° C. for 1 week, they were kept at respective preservation temperature values for 2 hours and then the load of each foamed chocolate was measured using a o rheometer (using a plunger with the diameter of 10 mm).

Evaluation Comparative Example 1

Twenty parts of hard butter (iodine value 34, melting point 34° C., produced by Fuji Oil Co., Ltd., trade name, "Melano New SS7") mixed with an emulsifier (produced by Sakamoto Yakuhin Kogyo Co., Ltd., trade name, "SY-Glyster PS310") for whipping was additionally mixed with 80 parts of a milk chocolate (produced by Fuji Oil Co., Ltd., trade name, "Milk Chocolate", oil content 34%). The addition amount of the emulsifier was controlled to be 0.5% in the finally obtained chocolate. The resulting chocolate whose oil components were thus adjusted was cooled to 35° C. and further mixed with a seed agent (produced by Fuji Oil Co., Ltd., trade name, "Choco Seed B") in 3.0% in the chocolate and subjected to tempering. The obtained chocolate was whipped by a Kenwood mixer (using a whipper) at a high stirring speed to obtain a foamed chocolate. The specific gravity of the obtained foamed chocolate was measured and found 0.75. After the foamed chocolate was aged at 20° C. for 1 week, the heat resistance of the chocolate was measured in the same manner as the Evaluation Example 1.

Evaluation Comparative Example 2

Ten parts of hard butter(iodine value 34, melting point 34° C., produced by Fuji Oil Co., Ltd., trade name, "Melano New SS7") mixed with an emulsifier (produced by Sakamoto Yakuhin Kogyo Co., Ltd., trade name, "SY-Glyster PS310") for whipping was additionally mixed with 80 parts of a milk chocolate (produced by Fuji Oil Co., Ltd., trade name, "Milk Chocolate", oil components 34%). The addition amount of the emulsifier was controlled to be 0.5% in the finally obtained chocolate. Further added was 10 parts of heat resistant fats and oils (iodine value 34.5, melting point 37° C., produced by Fuji Oil Co., Ltd., trade name, "Melano SS400"). The resulting chocolate whose oil components were thus adjusted was cooled to 35° C. and further mixed with a seed agent (produced by Fuji Oil Co., Ltd., trade name, "Choco Seed B") in 3.0% in the chocolate and subjected to tempering. The obtained chocolate was whipped by a Kenwood mixer (using a whipper) at a high stirring speed to obtain a foamed chocolate. The specific gravity of the obtained foamed chocolate was measured and found 0.74. After the foamed chocolate was aged at 20° C. for 1 week, the heat resistance of the chocolate was measured in the same manner as the Evaluation Example 1.

The evaluation of the heat resistance of the produced foamed chocolates was collectively shown in Table 3.

TABLE 3

Evaluation of the heat resistance

| Preservation temperature | Evaluation Example 1 | Evaluation Comparative Example 1 | Evaluation Comparative Example 2 |
|---|---|---|---|
| 31° C. | 120 g | 30 g | 100 g |
| 32° C. | 20 g | 3 g | 30 g |
| 33° C. | 2 g | 0 g | 0 g |
| Feeling evaluation | | | |
| Melting-in-palate | Good | Good | Stiff |

As shown in Table 3, the heat resistance of the Evaluation Example 1 was improved as compared with that of the Evaluation Comparative Example 1. Further, the Evaluation Example 1 showed the same heat resistance as that of the Evaluation Comparative Example 2 using conventional heat resistance fats. The mouth melt property of the Evaluation Example 1 was same as that of the Comparative Evaluation Example 1 and since the Comparative Evaluation Example 2 used conventional heat resistant fats, inferiority in mouth melt could not be avoided. Consequently, it was found that using the fats and oils of the present invention gave a foamed chocolate having excellent melting-in-palate property and high heat resistance.

Comparative Example 1

Ten parts of an oil mixture produced by mixing 90 parts of a slightly hydrogenated oil (iodine value 95) of rapeseed oil with a low erucic acid content and 10 parts of a fully hydrogenated oil (iodine value 1 or lower, melting point 58.5° C.) of palm oil in the same manner as the Example 1 was added to 90 parts of a chocolate separately tempered in the same manner as the Example 1 and the resulting chocolate mixture was treated in the same manner as the Example 1. The specific gravity of the obtained chocolate was measured and found to be 1.10.

Ten parts of an oil mixture produced by mixing 90 parts of a slightly hydrogenated oil (iodine value 95) of rapeseed oil with a low erucic acid content and 10 parts of a fully hydrogenated oil (iodine value 1 or lower, melting point 58.5° C.) of palm oil in the same manner as the Example 1 was added to 90 parts of a chocolate separately tempered in the same manner as the Example 1 and the resulting chocolate mixture was treated in the same manner as the Example 1. The specific gravity of the obtained chocolate was measured and found to be 1.10.

Ten parts of an oil mixture produced by mixing 90 parts of a slightly hydrogenated oil (iodine value 95) of rapeseed oil with a low erucic acid content and 10 parts of a fully hydrogenated oil (iodine value 1 or lower, melting point 62° C.) of rice bran oil in the same manner as the Example 1 was added to 90 parts of a chocolate separately tempered in the same manner as the example 1 and the resulting chocolate mixture was treated in the same manner as the Example 1. The specific gravity of the obtained chocolate was measured and found to be 0.98.

The characteristics of the produced foamed chocolates are collectively shown in Table 4.

TABLE 4

Results of the Comparative Examples 1 to 3

| No. | Item | Comparative Example 1 | Comparative Example 2 | Comparative Example 3 |
| --- | --- | --- | --- | --- |
| 1 | Edible fats and oils | Slightly hydrogenated oil of rapeseed oil with a low erucic acid content | Slightly hydrogenated oil of rapeseed oil with a low erucic acid content | Slightly hydrogenated oil of rapeseed oil with a low erucic acid content |
| 2 | Types of tri-saturated fatty acid glycerides or other high melting point fats and oils | fully hydrogenated oil of palm oil | fully hydrogenated oil of soybean oil | fully hydrogenated oil of rice bran oil |

TABLE 4-continued

Results of the Comparative Examples 1 to 3

| No. | Item | Comparative Example 1 | Comparative Example 2 | Comparative Example 3 |
| --- | --- | --- | --- | --- |
| 3 | Ratio of 1 to 2 | 90:10 | 90:10 | 90:10 |
| 4 | Ratio of 3 to chocolate | 10:90 | 10:90 | 10:90 |
| 5 | Oil content (%) of 4 | 40.6 | 40.6 | 40.6 |
| 6 | Specific gravity of 4 | 1.10 | 1.10 | 0.98 |
| 7 | Content (%) of 2 in the total amount of chocolate | 1 | 1 | 1 |
| 8 | Temperature (° C.) at the time of whipping | 29 | 29 | 29 |
| 9 | Workability | Good | Good | Good |
| 10 | Taste feel | Heavy feel | Heavy feel | Heavy feel |

Since the types of tri-saturated fatty acid glycerides to be used in the Comparative Examples 1 to 3 were changed to use tri-saturated fatty acid glycerides containing no behenic acid as the constituent fatty acids, the specific gravity values of the chocolates were not decreased.

Comparative Example 4

A mixture of 4 parts of the oil mixture produced in the Example 1 and 96 parts of the tempered chocolate was whipped and the specific gravity of the resulting foamed chocolate was measured to find to be 0.93.

Comparative Example 5

Five parts of an oil mixture produced by mixing 95 parts of a slightly hydrogenated oil (iodine value 95) of rapeseed oil with a low erucic acid content and 5 parts of a fully hydrogenated oil (iodine value 1 or lower, melting point 62° C.) of rapeseed oil with a high erucinic acid content as the tri-saturated fatty acid glycerides containing behenic acid in the same manner as the Example 1 was added to 95 parts of a chocolate separately tempered in the same manner as the Example 1 and the resulting chocolate mixture was treated in the same manner as the Example 1. The specific gravity of the obtained chocolate was measured and found to be 0.97.

Twenty parts of an oil mixture produced by mixing 80 parts of a slightly hydrogenated oil (iodine value 95) of rapeseed oil with a low erucic acid content and 20 parts of a fully hydrogenated oil (iodine value 1 or lower, melting point 62° C.) of rapeseed oil with a high erucinic acid content as the tri-saturated fatty acid glycerides containing behenic acid in the same manner as the Example 1 was added to 80 parts of a chocolate separately tempered in the same manner as the Example 1 and the resulting chocolate mixture was treated in the same manner as the Example 1. However the viscosity was extremely increased during the whipping and the chocolate mixture was hydrogenated. The specific gravity of the hydrogenated chocolate was measured and found decreased to 0.69, however the workability was inferior.

The characteristics of the produced foamed chocolates are collectively shown in Table 5.

TABLE 5

Results of the Comparative Example 4 to the Comparative Example 6

| No. | Item | Comparative Example 4 | Comparative Example 4 | Comparative Example 4 |
|---|---|---|---|---|
| 1 | Edible fats and oils | Slightly hydrogenated oil of rapeseed oil with a low erucic acid content | Slightly hydrogenated oil of rapeseed oil with a low erucic acid content | Slightly hydrogenated oil of rapeseed oil with a low erucic acid content |
| 2 | Type of tri-saturated fatty acid glycerides or other high melting point fats and oils | fully hydrogenated oil of rapeseed oil with a high erucic acid content | fully hydrogenated oil of rapeseed oil with a high erucic acid content | fully hydrogenated oil of rapeseed oil with a high erucic acid content |
| 3 | Ratio of 1 to 2 | 90:10 | 95:5 | 80:20 |
| 4 | Ratio of 3 to chocolate | 4:96 | 5:95 | 20:80 |
| 5 | Oil content (%) of 4 | 36.6 | 37.3 | 47.2 |
| 6 | Specific gravity of 4 | 0.93 | 0.97 | 0.69 |
| 7 | Content (%) of 2 in the total amount of chocolate | 0.40% | 0.25% | 4.00% |
| 8 | Temperature (° C.) at the time of whipping | 30 | 30 | 30 |
| 9 | Workability | Good | Good | Inferior |
| 10 | Taste feel | Heavy feel | Heavy feel | Good |

Since the contents of the tri-saturated fatty acid glycerides containing behenic acid in the chocolates of the Comparative Example 4 and the Comparative Example 5 were too little, the resulting chocolates were provided with insufficiently decreased specific gravity values and gave taste feel not so much different from that of a conventional chocolate. In contrast with that, since the content of the tri-saturated fatty acid glycerides in the chocolate of the Comparative Example 6 was too much, the specific gravity value of the chocolate was sufficiently decreased. However the chocolate was hydrogenated in the middle of the production work.

Comparative Example 7

Ninety parts of a slightly hydrogenated oil (iodine value 95) of rapeseed oil with a low erucic acid content and 10 parts of a fully hydrogenated oil (iodine value 1 or lower, melting point 62° C.) of rapeseed oil with a high erucic acid content as the tri-saturated fatty acid glycerides containing behenic acid were completely melted. Ninety parts of a separately melted chocolate was added to 10 parts of the previously prepared oil mixture in melted state, cooled and tempered in the same manner as the Example 1. The tempered chocolate was whipped in the same manner as the Example 1 and the specific gravity of the obtained chocolate was measured and found to be 1.10.

Comparative Example 8

After an oil mixture of 90 parts of a slightly hydrogenated oil (iodine value 95) of rapeseed oil with a low erucic acid content and 10 parts of a fully hydrogenated oil (iodine value 1 or lower, melting point 62° C.) of rapeseed oil with a high erucic acid content as the tri-saturated fatty acid glycerides containing behenic acid was once completely melted at 80° C., the oil mixture was left in a room and with the room temperature of 20° C. spontaneously cooled and solidified for a whole day and night. Ninety parts of a sweet chocolate (Fuji Oil Co., Ltd., oil content 34%/) separately tempered at the minimum point of 26° C. and reheating point of 28° C. was mixed with 10 parts of the previously prepared oil mixture and whipped in the same manner as the Example 1 and the specific gravity of the obtained chocolate was measured and found to be 0.97.

Comparative Example 9

After an oil mixture of 90 parts of a slightly hydrogenated oil (iodine value 95) of rapeseed oil with a low erucic acid content and 10 parts of a fully hydrogenated oil (iodine value 1 or lower, melting point 62° C.) of rapeseed oil with a high erucinic erucic acid content as the tri-saturated fatty acid glycerides containing behenic acid was once completely melted at 80° C., the oil mixture was quickly cooled to product temperature of 10° C. and mixed using a Combinator. Ten parts of the oil mixture was added to 90 parts of a chocolate tempered in the same manner as the Example 1 and further whipped in the same manner as the Example 1 and the specific gravity of the obtained chocolate was measured and found to be 1.04.

The characteristics of the produced foamed chocolates An are collectively shown in Table 6.

TABLE 6

Results of the Comparative Example 7 to the Comparative Example 9

| No. | Item | Comparative Example 7 | Comparative Example 8 | Comparative Example 9 |
|---|---|---|---|---|
| 1 | Edible fats and oils | Slightly hydrogenated oil of rapeseed oil with a low erucic acid content | Slightly hydrogenated oil of rapeseed oil with a low erucic acid content | Slightly hydrogenated oil of rapeseed oil with a low erucic acid content |
| 2 | Type of tri-saturated fatty acid glycerides or other high melting point fats and oils | Fully hydrogenated oil of rapeseed oil with a high erucic acid content | Fully hydrogenated oil of rapeseed oil with a high erucic acid content | Fully hydrogenated oil of rapeseed oil with a high erucic acid content |
| 3 | Ratio of 1 to 2 | 90:10 | 90:10 | 90:10 |
| 4 | Ratio of 3 to chocolate | 10:90 | 10:90 | 20:80 |
| 5 | Oil content (%) of 4 | 40.6 | 40.6 | 40.6 |
| 6 | Specific gravity of 4 | 1.10 | 0.97 | 1.04 |
| 7 | Content (%) of 2 in the total amount of chocolate | 1 | 1 | 1 |
| 8 | Temperature (° C.) at the time of whipping | 30 | 30 | 30 |
| 9 | Workability | Good | Good | Good |
| 10 | Taste feel | Heavy feel | Heavy feel | Heavy feel |

In the case of the Comparative Example 7, since after being melted, the fats and oils of the mixture of fats and oils in liquid state at 20° C. and the tri-saturated fatty acid glycerides containing behenic acid were added to the chocolate, the specific gravity of the obtained chocolate was not decreased. In the case of the Comparative Example 6 and the Comparative Example 9, since the preparation methods for the oil mixtures of the slightly hydrogenated oils of rapeseed oil with a low erucic acid content and the fully hydrogenated oils of rapeseed oil with a high erucinic acid content as tri-saturated fatty acid glycerides containing behenic acid were different from those of the examples, the specific gravity values of the obtained chocolates were not decreased. In the case of Comparative Example 8, it was assumedly attributed to that although the crystal system of the oil mixture was supposed to be same as that of the Example 1, the crystal size became large as compared with that of the oil mixture of the Example 1 owing to the extremely slow cooling. In contrast with that, in the case of the Comparative Example 9, it was assumedly attributed to that the crystal system became different from that of the Example 1 owing to the rapid cooling of the oil mixture and the crystal size was also supposed to be extremely fine, and as implied by the above description, it is supposed to be impossible to easily add foams to a chocolate unless the crystal system and the crystal size were adjusted to be proper.

Comparative Example 10

Rapeseed oil with a high erucic acid content and containing 45% of unsaturated fatty acids of 22 carbon atoms was fully hydrogenated and the fully hydrogenated oil was hydrolyzed and esterified to obtain ethyl fatty acid esters. The ethyl fatty acid esters were fractionated to obtain fraction containing 97.9% of saturated fatty acid esters with 20 to 24 carbon atoms, and 70 parts of such fatty acid esters were mixed with 30 parts of sunflower oil with a high oleic acid content and subjected to interesterification using enzymes selectively active on 1- and 3-locants to obtain a reacted oil with iodine value of 45 which was further fractionated with a solvent to obtain a high melting point fraction at 57.6% yield. The composition of the bonded fatty acids in the fraction was as follows. The composition had iodine value of 31.6 and contained 76% of 2-unsaturated-1,3-disaturted glyceride and 71.2 of 2-unsaturated-1,3-disaturated glyceride composed of unsaturated fatty acids of 18 or more carbon atoms and saturated fatty acids of 20 to 24 carbon atoms. The fatty acid composition was as follows (the upper stage shows chain length: the number of double bonds; and the lower stage shows %)

16:0 18:0 18:1 18:2 20:0 22:0 24:0

0.7 1.7 31.6 2.5 4.8 56.7 2.0.

Ten parts of the obtained fats and oils were mixed with 90 parts of a slightly hydrogenated oil (iodine value 95) of rapeseed oil with a low erucic acid content and a foamed chocolate was then produced in the same manner as the Example 1 and the specific gravity of the produced chocolate was measured and found to be 1.16.

The characteristics of the produced foamed chocolate are collectively shown in Table 7.

TABLE 7

Results of the Comparative Example 10

| No. | Item | Comparative Example 10 |
| --- | --- | --- |
| 1 | Edible fats and oils | Slightly hydrogenated oil of rapeseed oil with low erucic acid content |
| 2 | Types of tri-saturated fatty acid glycerides or other high melting point fats and oils | Interesterified oil |
| 3 | Ratio of 1 to 2 | 90:10 |
| 4 | Ratio of 3 to chocolate | 10:90 |
| 5 | Oil content (%) of 4 | 40.6 |

TABLE 7-continued

Results of the Comparative Example 10

| No. | Item | Comparative Example 10 |
| --- | --- | --- |
| 6 | Specific gravity of 4 | 1.16 |
| 7 | Content (%) of 2 in the total amount of chocolate | 1 |
| 8 | Temperature (° C.) at the time of whipping | 29 |
| 9 | Workability | Good |
| 10 | Taste feel | Heavy feel |

In the case of the Comparative Example 10, although tri-glycerides containing behenic acid were employed in the constituent fatty acids, the composition of the main triglycerides was not of tri-saturated fatty acid tri-glycerides, so that the specific gravity of the obtained chocolate was not decreased.

INDUSTRIAL APPLICABILITY

As described above, a foamed chocolate of the present invention can be produced by adding foams to a chocolate without requiring any emulsifiers or special apparatuses and can be provided with lightened taste feel. Further, a foamed chocolate of the present invention has a high heat resistance.

What is claimed is:

1. A foamed chocolate produced by a process comprising a step of formulating an oil mixture comprising edible fats and oils with tri-saturated fatty acid glycerides containing behenic acid, the specific gavity of said foamed chocolate being 0.5 to 0.9.

2. The foamed chocolate according to claim 1, wherein the behenic acid content in the tri-saturated fatty acid glycerides is 30% or higher.

3. The foamed chocolate according to claim 1, wherein the tri-saturated fatty acid glycerides containing behenic acid are a fully hydrogenated oil of rapeseed oil with a high erucic acid content.

4. The foamed chocolate according to claim 1, wherein a mixing ratio of the edible fats and oils to the tri-saturated fatty acid glycerides containing behenic acid in the oil mixture used is 85:15 to 95:5.

5. The foamed chocolate according to claim 1, wherein the content of the tri-saturated fatty acid glycerides containing behenic acid is 0.5 to 2% by weight based on the total amount of the foamed chocolate.

6. A process for producing a foamed chocolate, which comprises steps of melting crystals of an oil mixture of edible fats and oils with tri-saturated fatty acid glycerides containing behenic acid by warming, then crystallizing the tri-saturated fatty acid glycerides containing behenic acid by cooling the oil mixture, adding the resulting oil mixture to a blend of chocolate ingredients, and whipping the resultant blend until the specific gravity of the foamed chocolate becomes 0.5 to 0.9.

7. The process according to claim 6, wherein fats and oils containing 30% or more of behenic acid in their saturated fatty acids are used as the tri-saturated fatty acid glycerides containing behenic acid.

8. The process according to claim 6, wherein a fully hydrogenated oil of rapeseed oil with a high erucic acid content is used as the tri-saturated fatty acid glycerides containing behenic acid.

9. The process according to claim 6, wherein the oil mixture is added and used so that the content of the tri-saturated fatty acid glycerides containing behenic acid becomes 0.5 to 2% by weight based on the total amount of the foamed chocolate.

10. The process according to claim 6, wherein the resultant blend is whipped after the product temperature of the resultant blend is adjusted to 25° C. to 40° C.

* * * * *